United States Patent [19]

Chung et al.

[11] Patent Number: 5,696,211
[45] Date of Patent: Dec. 9, 1997

[54] SILICONE RELEASE COATING COMPOSITIONS

[75] Inventors: Kyuha Chung, Midland, Mich.; Simon Hurford, Cardiff; Bhukandas Parbhoo, Barry, both of United Kingdom

[73] Assignee: Dow Corning Corporation, Midland, Mich.

[21] Appl. No.: 767,176

[22] Filed: Dec. 16, 1996

[30] Foreign Application Priority Data

Dec. 23, 1995 [GB] United Kingdom ............... 9526498

[51] Int. Cl.⁶ .................................................. C08F 283/00
[52] U.S. Cl. ...................... 525/478; 528/12; 528/15; 528/42; 528/18; 528/20; 427/387
[58] Field of Search .................. 528/15, 42, 12, 528/18, 20; 525/478; 427/387

[56] References Cited

U.S. PATENT DOCUMENTS

| | | | |
|---|---|---|---|
| 3,527,659 | 9/1970 | Keil | 117/145 |
| 4,322,518 | 3/1982 | Blizzard | 528/15 |
| 4,465,805 | 8/1984 | Blizzard | 524/765 |
| 4,609,574 | 9/1986 | Keryk et al. | 427/407.1 |
| 4,652,096 | 3/1987 | Scott | 350/540 |
| 4,736,048 | 4/1988 | Brown et al. | 556/454 |
| 4,774,111 | 9/1988 | Lo | 427/387 |
| 4,842,902 | 6/1989 | Brown et al. | 427/387 |
| 4,889,753 | 12/1989 | Brown et al. | 428/40 |
| 4,961,963 | 10/1990 | Peters | 427/208.8 |
| 4,968,766 | 11/1990 | Kendziorski | 528/32 |
| 4,980,440 | 12/1990 | Kendziorski et al. | 528/15 |
| 4,980,443 | 12/1990 | Kendziorski et al. | 528/31 |
| 5,036,117 | 7/1991 | Chung et al. | 522/172 |
| 5,125,998 | 6/1992 | Jones et al. | 156/273.3 |
| 5,241,034 | 8/1993 | Herzig et al. | 528/15 |
| 5,273,946 | 12/1993 | Armstrong | 502/158 |
| 5,356,719 | 10/1994 | Hamada et al. | 428/447 |

FOREIGN PATENT DOCUMENTS

| | | | |
|---|---|---|---|
| 0108208 | 8/1983 | European Pat. Off. | C08L 83/04 |
| 0523660A1 | 7/1992 | European Pat. Off. | C08G 77/50 |
| 0652257A2 | 11/1994 | European Pat. Off. | C08L 83/07 |
| 0652258A2 | 11/1994 | European Pat. Off. | C08L 83/07 |

*Primary Examiner*—Melvyn I. Marquis
*Attorney, Agent, or Firm*—Timothy J. Troy

[57] ABSTRACT

Release modifier composition useful in release coating compositions comprising a fluorosilicone compound having perfluoroalkyl groups and at least three silicon-bonded hydrogen atoms and a MQ resin having at least one alkenyl group.

Release coating compositions comprising the release modifier compositions and a method for modifying the release force of release coating compositions is also claimed.

18 Claims, No Drawings

SILICONE RELEASE COATING COMPOSITIONS

The present invention relates to silicone release coating compositions. More particularly, the present invention relates to silicone release modifiers and to silicone release coating compositions containing the silicone release modifiers.

Silicone release coatings which are coated and cured onto various substrates often have very low release forces. It is not always desirable to have the release force low since in many applications it is important to maintain a certain amount of adhesive behaviour or provide several release liners with differing release forces. It is known to incorporate additives into silicone-based release coatings which cause an increase in release force required to peel off an adhesive label. Such additives are called controlled release additives or "CRA"s, and in some cases high release additives or "HRA"s. These types of additives have also been described as release modifiers or "RM"s, which is the term mainly used in the present specification.

Materials which are often used as release modifiers include silicone resins, for example siloxane resins comprising monovalent (M) siloxane groups ($R_3SiO_{1/2}$ groups wherein R is a monovalent hydrocarbon group) and tetravalent (Q) siloxane groups ($SiO_{4/2}$ groups) only, otherwise known as MQ resins. Siloxane MQ resins as additives to silicone release coatings have been described in the art. For example, Keil in U.S. Pat. No. 3,527,659 discloses a release agent for substrates consisting of a dimethylpolysiloxane-based formulation which is curable to an elastomer and a copolymer of $R_3SiO_{1/2}$ units and $SiO_{4/2}$ units wherein R can be methyl, ethyl, vinyl, or ethynyl and methyl is preferred. The release agents of Keil are described as having intermediate range release properties.

Blizzard in U.S. Pat. No. 4,322,518 teaches curable silicone compositions comprising a liquid copolymeric organopolysiloxane prepared by a method comprising forming a homogeneous mixture comprising a resinous copolymeric organopolysiloxane containing silicon-bonded hydroxyl groups and consisting of $R_3SiO_{1/2}$ units and $SiO_{4/2}$ units wherein R is an alkyl group such as methyl or an alkenyl group such as vinyl and a liquid organohydrogenpolysiloxane, and heating said homogenous mixture, and a polydiorganosiloxane containing silicon-bonded vinyl radicals and/or silicon-bonded hydroxyl radicals.

In EP 108,208-A is disclosed a release modifier which comprises a MQ resin or vinyl functional MQ resin dispersed in an organic reactive diluent such as dibutyl maleate, decylvinylether, camphene, or $C_{16}$–$C_{18}$ α-olefins. EP 108, 208-A further discloses that these release modifiers are useful in solventless silicone release coating compositions comprising alkenyl or silanol-functional polydiorganosiloxanes, polymethylhydrogensiloxanes, a precious metal catalyst, and certain carboxylic acid ester inhibitors.

Other alkenyl MQ resins have also been disclosed as being useful additives to silicone release coating compositions. For example, Keryk et al. in U.S. Pat. No. 4,609,574 disclose that toluene soluble siloxane resins which are copolymers of $(CH_3)_3SiO_{1/2}$ units, alkenyldimethylsiloxane units, and $SiO_{4/2}$ units wherein the alkenyl group is represented by the formula —R'$(CH_2)_m$CH=$CH_2$ wherein R' denotes —$(CH_2)_n$— or —$(CH_2)_p$—CH=CH— and m has the value of 1, 2, or 3, n has the value of 3 to 6, and p has the value of 3, 4, or 5, are especially useful as release modifiers for curable silicone release coatings containing higher alkenyl groups with 6 or more carbon atoms.

EP 523,660-A teaches a curable composition which comprises alkenyl siloxane copolymers, organopolysiloxanes having silicon-bonded hydrogen atoms, and a suitable catalyst, wherein the alkenyl siloxane copolymers have (a) units of the formula $R_aSi(OR^1)_bO_{4-(a+b)/2}$ wherein R is a $C_{1-18}$ hydrocarbon, $R^1$ is a $C_{1-4}$ alkyl group, a and b are 0, 1, 2, or 3, and a+b is no more than 3, (b) at least one unit of the formula $AR_sSiO_{3-c/2}$ wherein A is a group —$CH_2CHR^3R^2(CR^3=CH_2)_{x-1}$ wherein $R^2$ is a di-, tri-, or tetra-valent $C_{1-25}$ hydrocarbon group, $R^3$ is H or a $C_{1-6}$ alkyl group and x is 2, 3, or 4, and (c) on average at least one of certain units which have a silcarbane linkage. In addition controlled release agents such as MQ resins, vinyl-functional MQ resins, or MQ resins containing silicon-bonded hydrogen groups are disclosed.

Many other patents disclose the inclusion of MQ resins, vinyl functional MQ resins, or alkenyl functional MQ resins into curable silicone coating compositions to modify their release characteristics, for example U.S. Pat. Nos. 4,652,096, 4,774,111, 4,961,963, 5,036,117, 5,125,998, and 5,273,946.

More recently other types of release modifiers have been disclosed. For example, in EP 652,257-A is disclosed a release modifier comprising (i) a MQ resin consisting essentially of units of the formulae $SiO_2$ and $R_3SiO_{1/2}$ wherein R denotes a monovalent hydrocarbon group having up to 3 carbon atoms, a hydrogen atom, an alkenyl group of the formula —R'CH=$CH_2$, wherein R' denotes an alkylene group of from 0 to 3 carbon atoms, provided there is at least one group —R'CH=$CH_2$ present per MQ molecule and (ii) an α, ω-diolefin of the general formula $CH_2$=CH—$(CH_2)_n$—CH=$CH_2$, wherein n denotes an integer with a value of from 4 to 18. The release modifier is disclosed as giving improved release force over prior art release modifiers. Also disclosed are solventless release compositions based on siloxanes having SiH groups and a catalyst in addition to the release modifier.

In EP 652,258-A there is described a release modifier for silicone release compositions which comprises a MQ resin consisting essentially of units of the formulae $SiO_2$ (Q) and $R_3SiO_{1/2}$ (M) wherein R denotes a monovalent hydrocarbon group having up to 3 carbon atoms, a hydrogen atom, an alkenyl group of the formula —R'CH=$CH_2$ or an oxyalkenyl group of the formula —OR'CH=$CH_2$, wherein R' denotes an alkylene group of from 4 to 12 carbon atoms, provided there is at least one group —R'CH=$CH_2$ or one group —OR'CH=$CH_2$ present per MQ resin molecule and that no more than 50% of all M units have such groups. Also disclosed are solventless release compositions based on siloxanes having SiH groups and a catalyst in addition to the release modifier.

Conventional MQ resins and alkenyl-functional MQ resins do not, however, provide industry with solutions to all of their requirements. There is a continuing need for improved release modifiers which will give increased release forces. There is a particular need to find release modifiers which will provide a controllable release force at low speed delamination and at higher speed delamination.

Fluorosilicone compounds have also been described in the art. For example, Blizzard et al. in U.S. Pat. No. 4,465,805 disclose hydrocarbon liquid resistant fluorosilicones which comprise (a) the reaction product of (i) a certain organosilicon resin consisting essentially of $R_3SiO_{1/2}$ units and $SiO_{4/2}$ units wherein R is a monovalent hydrocarbon radical, and (ii) a polyorganohydrogensiloxane, (b) a fluorosilicone containing vinyl radicals or hydroxy radicals, and (c) a catalyst.

Brown et al. in U.S. Pat. Nos. 4,736,048, 4,889,753, and 4,842,902 disclose a coating composition comprising a curable mixture consisting essentially of (a) a fluorosilicone polymer containing an average of at least two silicon-bonded curing radicals per molecule from the group consisting of hydrogen, hydroxyl, and alkenyl, and at least two mole percent, based on the total number of siloxane units in the fluorosilicone polymer, of fluorinated siloxane units, and (b) an effective amount of a curing agent for the fluorosilicone polymer. Brown et al. further discloses that these coating compositions are useful as release liners for pressure sensitive adhesives.

Kendziorski in U.S. Pat. Nos. 4,968,766, 4,980,440, and 4,980,443 discloses a new organohydrogensiloxane compound and a new fluorosilicone polymer having unique properties which allow for the preparation of faster curing coating compositions having longer bath life than those disclosed in the art. Kendziorski discloses that the new polymers, when mixed with a metal-containing hydrosilylation catalyst and a catalyst inhibitor provide improved coating compositions which are useful for preparing a release liner to protect silicone-based pressure sensitive adhesives.

Hamada et al. in U.S. Pat. No. 5,356,719 disclose a fluorosilicone release composition comprising an organopolysiloxane containing at least one fluorine-containing organic group and at least 2 alkenyl groups per molecule, an organohydrogenpolysiloxane having at least two silicon-bonded hydrogen atoms in each molecule, an organopolysiloxane having at least one fluorine-containing organic group per molecule with the proviso that it contains neither alkenyl groups nor silicon-bonded hydrogen groups, and a catalytic amount of a hydrosilylation catalyst.

We have now found that certain fluorosilicone compounds are useful as release modifiers or in release modifier compositions for use in certain release coating compositions. Such release coating compositions comprising the fluorosilicone release modifiers are new and show improved release characteristics.

According to the invention there is provided a silicone release coating composition comprising (A) a release modifier which comprises at least 0.05% by weight based on the total weight of the release coating composition of a fluorosilicone compound (i) having the formula:

$$AR'_2SiO(R'_2SiO)_l(R'SiO)_m(R'HSiO)_nSiR'_2A$$
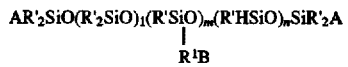

wherein R' denotes a monovalent aromatic or saturated aliphatic hydrocarbon having from 1 to 20 carbon atoms, A denotes R' or hydrogen, $R^1$ is an alkylene group having at least 2 carbon atoms, and B is a perfluoroalkyl group having from 4 to 8 carbon atoms, l has a value of from 0 to 100, m has a value of from 1 to 100, and n has a value of from 1 to 100 with the proviso that m/(l+m+n) has a value greater than or equal to 0.08 and with the proviso that there are at least 3 silicon-bonded hydrogen atoms per compound (i); (B) an organosilicon compound having at least three silicon-bonded hydrogen atoms per molecule; (C) an effective amount of a precious metal catalyst capable of promoting the addition reaction between alkenyl groups and silicon-bonded hydrogen groups; and (D) a polydiorganosiloxane having the general formula $Y^oX_2SiO(X_2SiO)_x(XYSiO)_y SiX_2Y^o$ wherein each X denotes independently a phenyl group or a saturated monovalent group having from 1 to 10 carbon atoms, Y denotes an alkenyl group having up to 6 carbon atoms, and $Y^o$ denotes X or Y. The average value of the sum total of x and y above are such that the siloxane polymer of Component (D) has a viscosity at 25° C. of at least 10 mPa.s The release modifier used in the coating compositions according to the invention comprises a fluorosilicone of the formula given above. Each R' group is independently a monovalent aromatic or saturated aliphatic hydrocarbon group having from 1 to 20 carbon atoms. Suitable R' groups include alkyl groups, such as methyl, ethyl, propyl, butyl, hexyl, octyl, and decyl; cycloaliphatic groups, such as cyclohexyl; aryl groups, such as phenyl, tolyl, and xylyl and aralkyl groups, such as benzyl and phenylethyl. Highly preferred R' groups are methyl or phenyl. Each perfluoroalkyl group B is bonded to a silicon atom through a group $R^1$, which group can have a straight or branched structure. Examples of suitable $R^1$ groups include —$CH_2CH_2$—, —$CH_2CH_2CH_2$—, —$CH(CH_3)CH_2$—, —$(CH_2)_4$—, —$CH(CH_3)CH_2CH_2$—, —$(CH_2)_5$—, —$(CH_2)_6$—, —$CH_2CH_2CH(CH_2CH_3)CH_2$—, —$(CH_2)_8$—, —$(CH_2)_{10}$—, —$(CH_2)_{18}$— or (—$C_6H_4CH_2$—). It is preferred that $R^1$ is selected from —$CH_2CH_2$— or —$CH_2CH_2CH_2$—.

The perfluoroalkyl group B can have a normal or a branched structure. Examples of suitable B groups include —$C_4F_9$ groups such as —$(CF_2)_3CF_3$, —$CF_2CF(CF_3)_2$, —$C(CF_3)_3$, or —$CF(CF_3)CF_2CF_3$, —$C_5F_{11}$ groups such as —$(CF_2)_4CF_3$, —$C_6F_{13}$ groups such as —$CF_2(CF_2)_4CF_3$, —$C_7F_{15}$ groups such as —$(CF_2CF_2)_3CF_3$ and —$C_8F_{17}$ groups. It is preferred that the perfluoroalkyl group B is selected from —$(CF_2)_3CF_3$, —$CF_2CF(CF_3)_2$, —$C(CF_3)_3$, and —$CF(CF_3)CF_2CF_3$.

In the formula for the fluorosilicone compound above, it is preferred that the value of m+n is from 20 to 80. It is also preferred that the value of n/(m+n) is from 0.6 to 0.8. It is to be noted that these values of m and n are average values, as is well appreciated in the art, and that there will likely be organohydrogenpolysiloxane compounds present wherein the values of m and n are much less or much more than the average values. It is also preferred that the value of l is 0. The fluorosilicone compounds for use in the release modifiers of this invention are known as is their method of preparation. Silicone polymers bearing $R^1B$ groups and silicon-bonded hydrogen groups can be prepared for example by the method of Kendziorski et al. as disclosed in U.S. Pat. No. 4,980,443 to which the reader is referred.

Component (B) of the silicone release coating composition is present as a crosslinking component or curing agent for the alkenyl functional materials by addition reaction. Suitable organosilicon compounds for the crosslinking component have at least three silicon-bonded hydrogen atoms per molecule, preferably linked to three separate silicon atoms. Preferred organosilicon compounds (B) are substantially linear or cyclic compounds. However, small amounts of trifunctional or tetrafunctional siloxane units may also be present. Such units would have the general formula $SiO_2$ and $R^3SiO_{3/2}$ wherein $R^3$ denotes an alkyl or aryl group having up to 10 carbon atoms or a hydrogen atom, but they are preferably only present in amounts up to 3% based on the total number of units present in the organohydrogensilicon compounds, more preferably they are totally absent.

Preferred compounds for (B) are organosilicon compounds having the general formula

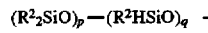

wherein $R^2$ denotes an alkyl or aryl group having up to 10 carbon atoms, $R^3$ is as defined above, p has a value of from 0 to 20, q has a value of from 1 to 70, and there are at least 3 silicon-bonded hydrogen atoms present per molecule. It is not important if the silicon-bonded hydrogen atoms are on terminal silicon atoms or not. It is preferred that $R^2$ denotes a lower alkyl group having no more than 3 carbon atoms, most preferably a methyl group. $R^3$ preferably denotes an $R^2$ group. Preferably p=0 and q has a value of from 6 to 40, more preferably 8 to 20, or where cyclic organosilicon materials are used, from 3 to 8. The crosslinking component may comprise a mixture of several organosilicon compounds as described. It is preferred that the viscosity is kept low when the release coating composition also comprises high viscosity polymers, particularly those of component (D) so that the total viscosity of the release coating composition is kept reasonably low which is beneficial for the application of the composition to a substrate. Suitable viscosity for component (B) would be less than 0.1 Pa.s, preferably less than 0.05 Pa.s. Suitable organosilicon compounds (B) are well known in the art and have been described in several publications, as are methods of making them.

The amount of crosslinking component (B) which is used in a release coating composition is preferably sufficient to provide a ratio of the number of silicon-bonded hydrogen atoms over the number of alkenyl groups in the composition of about 1/1, i.e. in stoichiometric amounts. The alkenyl groups which have to be taken into account include those present in component (D) of the release coating composition, and where applicable any alkenyl groups in additional ingredients, e.g. MQ resin, as will be described below, those present in any diluent or other material present in addition to the release modifier such as methylvinylcyclosiloxanes. It is however, more preferred to have some stoichiometric excess of SiH groups present to ensure complete crosslinking of the composition. Preferred SiH/alkenyl ratios are from 1.1/1 to 1.8/1, more preferably 1.1/1 to 1.4/1.

Component (C) is a catalyst which is suitable for promoting the addition reaction of alkenyl groups with silicon-bonded hydrogen atoms. Some catalyst is usually already present in component (A), but additional amounts of the catalyst may be added as component (C), especially if large amounts of component (D) and small amounts of component (A) are used. Suitable catalysts are accordingly those based on precious metals, particularly Group VIII metals, including ruthenium, rhodium, palladium, osmium, iridium and platinum. Preferably the catalyst is a well-known platinum compound or complex which is widely used, because they provide a more favourable effect for the compositions of this invention in terms of improved release force. Suitable platinum compounds and complexes include chloroplatinic acid, platinum acetylacetonate, complexes of platinous halides with unsaturated compounds such as ethylene, propylene, organovinylsiloxanes, and styrene, hexamethyldiplatinum, $PtCl_2$, $PtCl_3$, $PtCl_4$, and $Pt(CN)_3$. The preferred platinum catalyst is a form of chloroplatinic acid, either as the commonly available hexahydrate form or in its anhydrous form, as taught in U.S. Pat. No. 2,823,218. Another particularly useful catalyst is the composition that is obtained when chloroplatinic acid is reacted with an aliphatically unsaturated organosilicon compound such as divinyltetramethyldisiloxane, as disclosed in U.S. Pat. No. 3,419,593. It is preferred that catalyst (C) is employed in an amount giving from 20 to 500 ppm by weight of platinum metal based on the total weight of the release coating composition.

Component (D) is a polydiorganosiloxane having the general formula $Y°X_2SiO(X_2SiO)x(XYSiO)_ySiX_2Y°$ wherein each X denotes independently a phenyl group or a saturated monovalent group having from 1 to 10 carbon atoms preferably a saturated hydrocarbon group such as an alkyl or cycloalkyl group, for example, methyl, ethyl, propyl, butyl, and cyclohexyl. At least 90% of all the X substituents of the polydiorganosiloxane are preferably methyl groups, most preferably all being methyl groups. Y denotes an alkenyl group having up to 6 carbon atoms as identified above, and $Y°$ denotes X or Y. It is preferred that each alkenyl group Y in component (D) is a vinyl or hexenyl group. It is preferred that no more than 1% of all units of the siloxane are units with an alkenyl group, as otherwise there is the possibility of crosslinking the release coating composition too much upon curing. It is possible but not preferred that small amounts (less than 1% of all the substituents present) of other substituents are present, for example hydroxyl groups. Even though the polydiorganosiloxanes suitable as component (D) in the compositions of the invention are substantially linear polymers, it is allowable that a small number of units (no more than 1% of the total number of units) cause branching of the polymer. Such units would be tetra-functional ($SiO_2$) or trifunctional units ($Y°SiO_{3/2}$). Preferably no such units are present.

The average value of the sum total of x and y above are such that the siloxane polymer of Component (D) has a viscosity at 25° C. of at least 10 mPa.s. Preferably the viscosity at 25° C. is in the range from 0.05 to 5 Pa.s, most preferably 0.2 to 0.5 Pa.s. Such polydiorganosiloxanes are well known in the art as are methods for their preparation.

It is however surprising that polydiorganosiloxane (D) can be used in conjunction with a fluorosilicone compound (i), as the prior art seems to indicate that compound (i) requires the presence of fluorosilicone polymers having silicon-bonded vinyl groups (as e.g. disclosed in U.S. Pat. No. 4,980,443).

We have also found that when fluorosilicone compounds as described above are combined with certain resinous materials, release modifier compositions with improved performance are produced. These release modifier compositions are in themselves novel, and form another aspect of the invention.

According to this aspect of the invention there is provided a release modifier composition which comprises (i) a fluorosilicone compound having the formula:

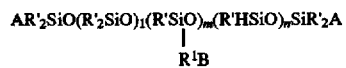

as described in the previous aspect of the invention and (ii) a MQ resin consisting essentially of units of the formulae: $SiO_2$ (Q) and $R_3SiO_{1/2}$ (M) wherein R is selected from a monovalent aromatic or saturated aliphatic hydrocarbon group having from 1 to 20 carbon atoms, a hydrogen atom or an alkenyl group having from 2 to 20 carbon atoms, provided that there is at least one alkenyl group having terminal unsaturation per MQ resin molecule.

Suitable MQ resins for use in addition to fluorosilicone compound (i) in the release modifier compositions according to the invention consist essentially of monovalent and tetravalent siloxane units as indicated above, preferably they consist only of such units. However it is allowable to have some other units present in small amounts without causing any negative effect. Extra units may include $HOR_2SiO_{1/2}$ units where R is as defined above, and even some divalent and trivalent siloxane units, provided the extra units do not make up more than 3% of the total number of units in the MQ resin molecule. It is further preferred that the group R is an alkyl group, most preferably a methyl group.

Suitable MQ resins for use in the release modifier compositions according to the invention preferably have a ratio of M units to Q units of from 0.2/1 to 4/1. At ratios lower than 0.2/1, the viscosity of the MQ resins is reasonably high, which makes the handling, incorporation and application of the release modifier compositions more difficult. Where the ratio is much lower than 0.2/1 the MQ resin would be solid under normal conditions of temperature and pressure, which would make it much more difficult to use the resins as potentially large amounts of solubiliser would be required in the release modifier composition. Potential solubilisers include organic solvents such as xylene or toluene. However it is preferred not to have such solvents present. At ratios which are higher than 4/1 the viscosity of the resins would be extremely low and although resin could easily be handled, the application onto a substrate could cause difficulty. It is preferred that the viscosity of the release modifier composition is at least about 100 mPa.s at 25° C. It is preferred that the MQ resins in the release modifier compositions of the invention have a ratio of M to Q units of from 0.6/1 to 1.8/1, more preferably from 1.2/1 go 1.6/1, and most preferably 1.4/1.

R groups of the MQ resin are preferably selected from monovalent aromatic or saturated aliphatic hydrocarbon groups having from 1 to 20 carbon atoms or alkenyl groups having from 2 to 20 carbon atoms. Examples of R groups include alkyl groups, such as methyl, ethyl, propyl, butyl, hexyl, octyl, and decyl; cycloaliphatic groups, such as cyclohexyl; aryl groups, such as phenyl, tolyl, and xylyl; aralkyl groups, such as benzyl and phenylethyl. Highly preferred R groups are methyl or phenyl. The alkenyl groups having terminal unsaturation, i.e. where at least a C=C double bond occurs between the ultimate and penultimate carbon atoms furthest away from the silicon atom to which it is linked, are preferably selected from vinyl or higher alkenyl groups having the formula $-(CH_2)_aCH=CH_2$ wherein a has a value of 1 to 18, or higher alkenyl groups having the formula $-(CH_2)_bCH=CH-(CH_2)_cCH=CH_2$ wherein b has a value of 1 to 9 and c has a value of 1 to 9. Preferably a in the above formula has a value of 4 to 12, b has a value of 3 to 5, and c has a value of 1 to 3. Thus the higher alkenyl groups include 5-hexenyl, 6-heptenyl, 7-octenyl, 8-nonenyl, 9-decenyl, 10-undecenyl, 4,7-octadienyl, 5,8-nonadienyl, 5,9-decadienyl, 6,11-dodecadienyl and 4,8-nonadienyl. Alkenyl radicals selected from vinyl, 5-hexenyl, 7-octenyl, 9-decenyl, 10-undecenyl, 5,9-decadienyl, and 6,11-dodecadienyl, are preferred.

It is preferred in the MQ resins for the release modifier compositions of the instant invention that no more than one alkenyl group is substituted on any silicon atom and that no more than 50% of all M units have an alkenyl group. More preferably from 10 to 35% of all M units have an alkenyl group, most preferably from 15 to 25%.

The most efficient increase of release force for a cured release coating resulting from a release composition incorporating a release modifier composition according to the invention is obtained when the weight percentage of the alkenyl groups in the MQ resin of the release modifier composition is no more than 25% of the total weight of the MQ resin. More preferably the weight percentage ranges from 8 to 18% and most preferably from 12 to 16%. It is also preferred that the ratio of monovalent units wherein one of the R groups is an alkenyl group to tetravalent ($SiO_2$) siloxane units is from 0.05/1 to 0.5/1, more preferably from 0.1/1 to 0.4/1 and most preferably 0.2/1.

Examples of particularly useful MQ resins for the release modifier compositions according to the invention have the following ratio formulae (i.e. subscripts indicate the number ratio of the different units) wherein M denotes $(CH_3)_3SiO_{1/2}$ units, $M^n$ denotes $[CH_2=CH-(CH_2)_n][(CH_3)_2]SiO_{1/2}$ wherein n denotes the number of divalent $-CH_2-$ units in the alkenyl group and Q denotes the $SiO_2$ group: $M_{0.9}M^6_{0.2}Q$, $M_{1.2}M^8_{0.2}Q$, $M_{1.4}M^4_{0.4}Q$, $M_1M^{10}_{0.3}Q$ and $M_1M^{12}_{0.3}Q$.

MQ resins which are suitable for use in the release modifier composition according to the invention can be prepared by a number of processes. One method includes the making of an MQ resin having a number of silanol groups, followed by the reaction of that resin with capping groups which include hexaorganodisilazane wherein some or all of the organo groups could be methyl or vinyl. Particularly useful capping groups are hexamethyldisilazane and tetramethyl-divinyldisilazane. Where larger alkenyl groups are required, for example pentenyl or hexenyl groups, it is possible to make them by an addition reaction of a dialkene to a MQ resin having at least one silicon-bonded hydrogen atom in one of its monovalent units in the presence of a catalyst which promotes the addition reaction of the SiH group to an olefinically unsaturated compound.

The most convenient process is an addition reaction of a dialkene of the general formula $CH_2=CH-R^o-CH=CH_2$, wherein $R^o$ denotes an alkylene group of from 2 to 10 carbon atoms to an MQ resin having at least one monovalent unit having a silicon-bonded hydrogen atom in the presence of a catalyst which promotes the addition reaction of the SiH group to an olefinically unsaturated compound. MQ resins having silicon-bonded hydrogen atoms are known materials and have been described in a number of publications, as are methods for making them. The reader is referred to, for example, EP 389,138-A. Suitable dialkenes which may be used for the reaction are those of the formula $CH_2=CH-R^o-CH=CH_2$, wherein $R^o$ is as defined above. Examples of suitable dialkenes include α,ω-hexadiene, α,ω-decadiene, α,ω-undecadiene, and α,ω-dodecadiene. The addition reaction can be conducted under conditions known to the person skilled in the art in the presence of a suitable addition catalyst such as a platinum based catalyst. Although preferably all the silicon-bonded hydrogen atoms are reacted with the dialkene resulting in the fact that no SiH is present in the MQ resin, it is possible that small amounts of residual SiH could be present in the resin.

An alternative method of making suitable MQ resins for use in the release modifier compositions according to the invention is the condensation reaction of an unsaturated alcohol, being a α-ol,ω-ene of the general formula $HO-R''-CH=CH_2$, wherein $R''$ is an alkylene group having from 4 to 12 carbon atoms with an MQ resin having at least one silicon-bonded hydrogen atom in its monovalent units, in the presence of a catalyst which promotes the condensation reaction between an SiH group and a COH group, giving $H_2$ as a by-product. Suitable catalysts for said reaction are Sn based catalysts. Examples of suitable α-ol, ω-enes include $HO-(CH_2)_6-CH=CH_2$, $HO-(CH_2)_8-CH=CH_2$, and $HO-(CH_2)_{12}-CH=CH_2$.

Release modifier compositions according to the present invention may also comprise other ingredients, but are preferably solventless. Suitable ingredients include diluents, preferably siloxane materials. A particularly preferred siloxane material would be a linear alkenyl-substituted polydimethylsiloxane material, for example a vinyl-endblocked polydimethylsiloxanes or hexenyl-endblocked polydimethylsiloxanes having a chainlength of from 10 to 500 siloxane units, preferably 15 to 100, most preferably 20 to 50.

Release modifier compositions according to the invention can also comprise catalysts. As the release modifier composition is intended for formation of crosslinked siloxane coatings by addition reaction with an organosilicon compound having silicon-bonded hydrogen atoms, suitable catalysts would be catalysts which promote said addition reaction. Suitable catalysts have been described above as Component (C) of the release coating compositions.

Release modifier compositions according to the invention may also comprise inhibitors. The inhibitor can be any material that is known to be, or can be, used to inhibit the catalytic activity of the catalysts. Examples of suitable inhibitors include ethylenically or aromatically unsaturated amides, acetylenic compounds, ethylenically unsaturated isocyanates, olefinic siloxanes, unsaturated hydrocarbon diesters, conjugated ene-ynes, hydroperoxides, nitriles, and diaziridines.

Preferred inhibitors include acetylenic alcohols such as those disclosed in U.S. Pat. No. 3,445,420, including ethynylcyclohexanol and methylbutynol, unsaturated carboxylic esters such as diallyl maleate, dimethyl maleate, and butylallyl maleate, maleates and fumarates such as those disclosed in U.S. Pat. Nos. 4,562,096 and 4,774,111, including diethyl fumarate, diallyl fumarate, and bis-(methoxyisopropyl) maleate, and conjugated ene-ynes such as those disclosed in U.S. Pat. Nos. 4,465,818, 4,472,563, and 4,559,396. Also suitable as inhibitors in the release modifier compositions of the invention are cyclic siloxanes having the general formula $[(D)_2SiO]_w$ wherein D denotes a group selected from lower alkyl groups, preferably $C_{1-4}$ alkyl groups and lower alkenyl groups, preferably vinyl or allyl groups, and w has a value of from 3 to 8. Most preferred are those cyclic siloxanes in which each silicon atom has one alkyl and one alkenyl group, preferably a methyl and a vinyl group. Preferably the value of n is 4 or 5. Examples of the most preferred siloxanes are methylvinyltetracyclosiloxane and methylvinylpentacyclo-siloxane. It is also within the scope of the present invention that 2 or more of the above inhibitors may be present in release modifier compositions according to the present invention.

Release modifier compositions according to the invention preferably comprise from 10 to 95% by weight of the MQ resins indicated above and from 40% to 0.05% of the fluorosilicone compound (i). More preferably 40 to 80%, and most preferably 50 to 75% by weight of the release modifier composition is taken up with the MQ resin. More preferably the amount of fluorosilicone compound is from 0.5 to 30% by weight, most preferably 1 to 10%. The balance to 100% can be taken up by optional ingredients preferably, however, by an alkenyl-functional polysiloxane, which will help solubilise the MQ resin in the release modifier composition and a catalyst. A sufficient amount of the catalyst should be employed to provide a homogenous and effective cure of the composition. The preferred proportion of platinum catalyst is usually that which will provide from about 20 to about 500 parts by weight of Pt per million parts by weight of the combined crosslinking components used in the total coating composition in which the release modifier composition is used, more preferably 50 to 150 parts, most preferably 100 to 130 parts.

In yet another aspect the invention provides silicone release coating compositions which incorporate a release modifier composition described above. The release coating compositions which comprise the MQ resins of the release modifier compositions have already alkenyl-substituted siloxane materials present, which means that the use of Component (D) type compound as defined above becomes optional in these release compositions.

There is provided a silicone release coating composition comprising (A) a release modifier composition which comprises (i) a fluorosilicone compound having the formula:

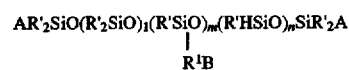

wherein R', A, $R^1$, B, l, m, n and m/(l+m+n) are as defined above with the proviso that there are at least 3 silicon-bonded hydrogen atoms per compound (i); and (ii) an MQ resin consisting essentially of units of the formulae: $SiO_2$ (Q) and $R_3SiO_{1/2}$ (M) wherein R is selected from a monovalent aromatic or saturated aliphatic hydrocarbon group having from 1 to 20 carbon atoms, a hydrogen atom or an alkenyl group having from 2 to 20 carbon atoms, provided that there is at least one alkenyl group having terminal unsaturation per MQ resin molecule (B) an organosilicon compound having at least three silicon-bonded hydrogen atoms per molecule; (C) an effective amount of a precious metal catalyst capable of promoting the addition reaction between alkenyl groups and silicon-bonded hydrogen groups; and optionally (D') a polydiorganosiloxane having at least 2 silicon-bonded alkenyl-functional groups per polydiorganosiloxane molecule (D'). Release modifier composition (A), its components (i) and (ii), Components (B) and (C) are as described above.

Component (D') is a polydiorganosiloxane having at least two silicon-bonded alkenyl-functional groups per molecule. The alkenyl group may be a cycloalkenyl or a linear alkenyl group, preferably having up to 6 carbon atoms, as exemplified by hexenyl, cyclohexenyl, vinyl, allyl and pentenyl. More preferred are cyclohexenyl, hexenyl, vinyl, or allyl groups, most preferably vinyl or hexenyl. Preferred polydiorganosiloxanes have the general formula as described for Component (D) above.

Release coating compositions according to the previous aspect of the invention may comprise only components (A), (B) and (C). In such compositions (C) would be present in catalytic amounts, while (A) and (B) would be present in amounts to give SiH/alkenyl ratios as described above. It is however preferred that the release coating compositions also comprise component (D'). The amount of component (D') in relation to component (A) will depend on the desired release characteristics of the cured release coating, and a number of factors influence this amount. It is most easily expressed as the percent of component (A) by weight based on the total weight of components (A), (C), and (D') combined. This may range from 1 to 99.9%, but more typically will lie in the range from 10 to 80% by weight. The amounts of each ingredient used in the composition have an effect on release force at a defined delamination speed of the final product in use, the required cure time and temperature and the slipstick behaviour.

Optionally any release coating composition according to the invention comprises additional ingredients. One useful ingredient is an α-olefin, particularly an olefin having 12 to 20 carbon atoms such as tetradecene, octadecene, and eicosene. Another particularly useful ingredient is a cure inhibitor as described above.

Release coating compositions according to the invention can also comprise bath life extenders in a total amount sufficient to further retard the curing reaction at room temperature such as those described in U.S. Pat. No. 5,036, 117 to which the reader is referred. Examples of suitable bath life extender compounds include compounds which contain one or more primary or secondary alcohol groups, carboxylic acids (including compounds which yield carboxylic acids when exposed to water), cyclic ethers, and water. Primary and secondary alcohols, preferably having fewer than 10 carbon atoms are the most preferred for the compositions of this invention. Examples thereof include methanol, ethanol, n-propanol, i-propanol, 1-butanol, 2-butanol, i-butanol, and normal-, secondary-, and isopentanols, hexanols, heptanols and octanols, tetradecanol and other alkanols; benzyl alcohol, phenol, and other aromatic alcohols such as methylphenyl carbinol, and 2-phenylethyl alcohol; allyl alcohol, and cyclohexanol. It is highly preferred that the bath life extender is benzyl alcohol or water. The amount of bath life extender that is to be used can be as high as 10% by weight, more preferably, 0.1 to 5% by weight, and most preferably 1 to 3% by weight, based on the weight of Components (A)(ii) and (D') combined. Other additives include colorants, dyes, preservatives, and fragrances.

Release coating compositions according to the invention may be prepared by any known method including mixing the ingredients. For storage stability purposes it is preferred to keep components (A)(ii) and (C) separate from components (A)(i) and (B) during storage. This could be achieved for example by mixing components (A)(ii), (C), and part of component (D') as a first mixture, and mixing components (A)(i) and (B) with the rest of component (D') as a second mixture. Alternatively, each of the components may be stored and supplied separately. In yet another option, component (A)(ii) is supplied as a first part, components (A)(i) and (B) as a second part, and a mixture of components (C) and (D') as a third part. Each part could include some of the other additional ingredients described above, for example an inhibitor. Immediately prior to using the composition for application to substrates the different parts and/or mixtures could be admixed in the required ratios, for example 1/1, 10/1, or even 100/1 where the composition is stored in 2 parts.

The invention also provides in another aspect a process of coating a substrate to provide a surface from which adhesive materials can be released, the process comprising applying to a substrate any of the silicone release coating compositions as described above, and thereafter exposing the substrate and applied composition to heat.

Any solid substrate may be treated by the process of this invention to provide release of adhesive materials therefrom. Examples of suitable substrates include cellulosic materials, such as paper, cardboard, and wood, metals such as aluminium, iron, and steel, siliceous materials such as ceramics, glass, and concrete, and synthetics such as polyester and polyepoxide. To assure proper curing and adhesion of the curable silicone release coating, the substrate to which it is applied should be clean and free of materials which undesirably inhibit the cure of the release coating, such as materials containing amines, mercaptans, and phosphines.

The process of this invention is particularly useful for coating flexible substrates, such as paper, aluminium foil, and tapes to provide controlled release of pressure sensitive adhesive materials such as aggressive acrylic adhesives.

The curable silicone release coating composition may be applied in a thin layer to the surface of the flexible substrate to provide a coating with a mass of approximately 1 g/m² of coated surface. In the paper coating art, the amount of release coating used will generally be between 0.1 to 2.0 g/m² of surface.

In a process according to the invention, the curable silicone release coating composition may be applied to a substrate by any suitable means, such as brushing, dipping, spraying, rolling, and spreading.

Flexible substrates, such as paper may be coated by any of the well known rolling methods, such as by a trailing blade coater, kiss rolls, gravure rolls and offset printing rolls as desired.

After application to a substrate, the silicone release coating and substrate are exposed to heat. Heating usually is limited to temperatures less than 300° C., preferably less than 200° C., and may be accomplished by any suitable means. However, the silicone release coating composition should not be heated too much prior to application. In many cases silicone release coating compositions according to the invention will cure to a state sufficient to give no smear, no migration, and no rub-off quicker than prior art compositions.

Silicone release coating compositions according to the invention provide coatings which give smooth release at low delamination speeds, for example 0.5 m/minute, or at high delamination speeds.

There now follow a number of examples in which all parts and percentages are given by weight unless otherwise indicated. In the examples herein below Me denotes methyl, Vi denotes vinyl, and Hex denotes hexenyl.

EXAMPLE 1

Silicone release coatings were prepared by mixing a silicone release coating (denoted Coating A in Table I), an MQ resin (denoted MQ1 in Table I) or a MQ resin in combination with a fluorosilicone compound (denoted FluoroSi in Table I), and an organosilicon compound containing silicon-bonded hydrogen atoms (denoted as SiH in Table I) on a rotary mixer for 10 minutes. These components were mixed in the amounts (parts by weight) denoted in Table I below. Six silicone release coatings were prepared, CREL 1 which contained no release modifier, CREL 2 which contained only an MQ resin as a release modifier, and the other four (REL 1-REL 4) were according to the invention and contained both a MQ resin and a fluorosilicone compound.

Coating A was a mixture containing about 97.29 grams(g) of a compound having the formula HexMe$_2$SiO(Me$_2$SiO)$_x$(MeHexSiO)$_y$SiMe$_2$Hex having 2 mole % hexenyl groups and having a degree of polymerisation of about 150, about 1.9 g of a platinum catalyst (a soluble platinum complex containing about 0.70% platinum formed from chloroplatinic acid and divinyltetramethyldisiloxane), and about 0.81 g of bis(2-methoxy-1-methylethyl) maleate.

MQ1 was a mixture containing about 41.2 g of a compound having the formula HexMe$_2$SiO(Me$_2$SiO)$_x$SiMe$_2$Hex having a degree of polymerisation of about 30 and about 58.8 g of an MQ resin having trimethylsiloxy units and dimethylvinylsiloxy units as its monofunctional (M) units and SiO$_2$ (Q) units where the molar ratio of M units to Q units is about 0.7/1 and the resin copolymer contains about 1.75 to 2.3 weight percent vinyl groups.

FluoroSi, the fluorosilicone compound, was a compound having the formula Me$_3$SiO(MeRSiO)$_{12}$(MeHSiO)$_{28}$SiMe$_3$ wherein R denotes the group —CH$_2$CH$_2$CF$_2$CF$_2$CF$_2$CF$_3$. SiH was a trimethyl-siloxy-endblocked polydimethylsiloxane-methylhydrogensiloxane copolymer having a total average degree of polymerisation of about 40 and about 70 mole % methylhydrogen moiety on the siloxane chain.

TABLE I

|           | CREL 1 | CREL 2 | REL 1 | REL 2 | REL 3 | REL 4 |
|-----------|--------|--------|-------|-------|-------|-------|
| Coating A | 10     | 9      | 9     | 9     | 9     | 9     |
| MQ1       | 0      | 1      | 1     | 1     | 1     | 1     |
| FluoroSi  | 0      | 0      | 0.1   | 0.15  | 0.2   | 0.4   |
| SiH       | 0.46   | 0.5    | 0.5   | 0.49  | 0.49  | 0.48  |

The six resulting silicone release coating compositions were then coated onto S2S Kraft paper by using a hand roll blade coater at around 0.7 lb/ream thickness.

The coated papers were cured in the forced air oven of a pilot coater at 300° C. for 15 seconds. A plastic film coated with a commercially available precast hotmelt pressure sensitive adhesive was relaminated over the newly prepared release coating surface by using a 5 lb hard rubber coated roller. The coating was aged for 1 day at room temperature before the lamination. The laminates were also aged for 1 additional day at room temperature under pressure. The laminates were cut into strips having about 1 inch width for a release force measurement. The release test was carried out at 3 delaminating speeds, 0.3 m/min., 10 m/min. and 300 m/min., using an Imass(R) high speed peel tester. The average of four measurements of the release force at each speed was taken and the resulting average value is denoted in Table II below for each sample. The release force is reported in grams in Table II.

TABLE II

| Release Coating | Release Speed (m/min) |       |       |
|-----------------|-----------------------|-------|-------|
|                 | 0.3                   | 10    | 300   |
| CREL 1          | 9.95                  | 15.4  | 62.85 |
| CREL 2          | 12.35                 | 16.85 | 64.55 |
| REL 1           | 460                   | 35.2  | 49    |
| REL 2           | 640                   | 142.5 | 92.9  |
| REL 3           | 950                   | Weld  | Weld  |
| REL 4           | Weld                  | Weld  | Weld  |

EXAMPLE 2

Silicone release coatings were prepared by mixing a silicone release coating (denoted Coating A or B in Table III below), one or more MQ resins (denoted MQ1 or MQ2 in Table III below), and a fluorosilicone compound (denoted FluoroSi in Table III below). These components were mixed in the amounts (grams) denoted in Table III below. Seventeen silicone release coatings were prepared, some of which were comparative release coatings (denoted CREL in Table III) and others were according to the invention (denoted REL in Table III).

Coating B was mixture containing about 97% of a compound having the formula $ViMe_2SiO(Me_2SiO)_xSiMe_2Vi$ having a degree of polymerisation of about 150, about 2% of a platinum catalyst (a soluble platinum complex containing about 0.70% platinum formed from chloroplatinic acid and divinyltetramethyldisiloxane), and about 1% of methylvinylcyclosiloxane.

Coating C was a mixture containing about 75% of a trimethylsiloxy-endblocked polymethylhydrogensiloxane having a silicon-bonded hydrogen content of about 1.6 weight percent and having a viscosity of about 30 $mm^2/s$, about 20% of a compound having the average formula $Me_3SiO(MehSiO)_5(Me_2SiO)_3SiMe_3$, and about 5% 3,5 dimethyl-1-hexyne-3-ol.

Release modifier system

MQ2 was a mixture of about 97% of an MQ resin having the formula $M_{1.2}M^8_{0.2}Q$ wherein M denotes $(CH_3)_3SiO_{1/2}$ units, $M^n$ denotes $[CH_2=CH-(CH_2)_n][(CH_3)_2]SiO_{1/2}$ wherein n denotes the number of $(CH_2)$ units in the alkenyl group and Q denotes the $SiO_2$ group, about 2% of a platinum catalyst (a soluble platinum complex containing about 0.70% platinum formed from chloroplatinic acid and divinyltetramethyldisiloxane), and about 1% methylvinylcyclosiloxane.

MQ3 was a mixture containing about 97% of a mixture containing 48% of a compound having the formula $ViMe_2SiO(Me_2SiO)_xSiMe_2Vi$ having a degree of polymerisation of about 25 and about 52% of an MQ resin having trimethylsiloxy units and dimethylvinylsiloxy units as its monofunctional (M) units and $SiO_2$ (Q) units where the molar ratio of M units to Q units is about 0.7/1 and the resin copolymer contains about 1.75 to 2.3 weight percent vinyl groups, about 2% of a platinum catalyst (a soluble platinum complex containing about 0.70% platinum formed from chloroplatinic acid and divinyltetramethyldisiloxane), and about 1% methylvinyltetracyclosiloxane.

FluoroSi, the Fluorosilicone compound was a compound having the formula $Me_3SiO(MeRSiO)_{12}(MeHSiO)_{28}SiMe_3$ wherein R denotes the group $-CH_2CH_2CF_2CF_2CF_2CF_3$.

In release coatings 1-11 (REL 1-REL 11), about 91.5 parts of Coating C and about 8.5 parts of FluoroSi were premixed prior to addition of the other components.

TABLE III

| Release Coating | Components (grams) |           |      |      |                       |
|-----------------|--------------------|-----------|------|------|-----------------------|
|                 | Coating B          | Coating C | MQ2  | MQ3  | Coating C + FluoroSi  |
| CREL 1          | 5000               | 137       | —    | —    | —                     |
| CREL 2          | 4000               | 189       | —    | 1000 | —                     |
| CREL 3          | 3000               | 241       | —    | 2000 | —                     |
| CREL 4          | 2000               | 293       | —    | 3000 | —                     |
| CREL 5          | 1000               | 345       | —    | 4000 | —                     |
| CREL 6          | —                  | 398       | —    | 5000 | —                     |
| REL 1           | 5000               | —         | —    | —    | 145                   |
| REL 2           | 4000               | —         | —    | 1000 | 200                   |
| REL 3           | 3000               | —         | —    | 2000 | 255                   |
| REL 4           | 2000               | —         | —    | 3000 | 310                   |
| REL 5           | 1000               | —         | —    | 4000 | 366                   |
| REL 6           | —                  | —         | —    | 5000 | 421                   |
| REL 7           | 4000               | —         | 1000 | —    | 187                   |
| REL 8           | 3000               | —         | 2000 | —    | 229                   |
| REL 9           | 2000               | —         | 3000 | —    | 271                   |
| REL 10          | 1000               | —         | 4000 | —    | 314                   |
| REL 11          | —                  | —         | 5000 | —    | 356                   |

All of the silicone release coating compositions were then applied to Glassine® (AV100) paper on a production scale coater at a line speed of 300 m/min. and cured at 200° C. to a condition of no smear, no migration, and no rub-off (NNN). All further testing was done on these samples when cured to NNN. Laminates were prepared off-line using standard TESA® tapes, immediately following cure. Three tapes were used in particular: TESA® 7475 which uses an acrylic adhesive, and TESA® 4154 and 7476, which use a rubber adhesive. Delamination of the tapes from the paper sheets was effected using a Lloyd® Instrument delaminator for a delamination speed of 0.3 m/minute.

Delamination was done after storing the laminated paper for 4 weeks at room temperature (20° C.). Release forces were determined and are given in Table IV. The slipstick factor was also measured which is an indication of the smoothness of the release. Slipstick factor is calculated as the mean release force maxima (Mean Max Load) (average of 10 points) over the mean release force (Mean Load).

The lower the factor, the smoother is the delamination. A slipstick factor of less than 1.10 is normally taken as smooth release. In Table IV below release forces are given in g/20 mm for the TESA® 7475 and TESA® 7476 tapes, in g/25 mm for the TESA® 4154 tape, and delamination speed in metre/min.

TABLE IV

| Release Force at Delamination Speed of 0.3 m/min. | | | |
|---|---|---|---|
| Release Coating | Tape | Mean Load | Mean Max Load | Slip-stick Factor |
| CREL 1 | 7475 | 19.4 | 20.8 | 1.07 |
| CREL 1 | 7476 | 38.0 | 45.6 | 1.20 |
| CREL 1 | 4154 | 7.1 | 7.8 | 1.10 |
| CREL 2 | 7475 | 25.7 | 26.7 | 1.04 |
| CREL 2 | 7476 | 46.6 | 49.5 | 1.06 |
| CREL 2 | 4154 | 9.8 | 10.4 | 1.06 |
| CREL 3 | 7475 | 51.5 | 54.5 | 1.06 |
| CREL 3 | 7476 | 66.3 | 71.9 | 1.08 |
| CREL 3 | 4154 | 20.9 | 21.6 | 1.03 |
| CREL 4 | 7475 | 95.9 | 102.2 | 1.07 |
| CREL 4 | 7476 | 84.9 | 90.8 | 1.07 |
| CREL 4 | 4154 | 51.3 | 54.5 | 1.06 |
| CREL 5 | 7475 | 157.2 | 161.6 | 1.03 |
| CREL 5 | 7476 | 108.3 | 120.1 | 1.11 |
| CREL 5 | 4154 | 116.9 | 124.0 | 1.06 |
| CREL 6 | 7475 | 659.0 | 688.6 | 1.04 |
| CREL 6 | 7476 | 420.9 | 467.1 | 1.11 |
| CREL 6 | 4154 | 358.2 | 371.0 | 1.04 |
| REL 1 | 7475 | 36.6 | 37.7 | 1.03 |
| REL 1 | 7476 | 47.3 | 50.8 | 1.07 |
| REL 1 | 4154 | 12.3 | 13.0 | 1.06 |
| REL 2 | 7475 | 70.4 | 72.0 | 1.02 |
| REL 2 | 7476 | 57.8 | 62.1 | 1.07 |
| REL 2 | 4154 | 33.7 | 36.2 | 1.07 |
| REL 3 | 7475 | 109.8 | 114.0 | 1.04 |
| REL 3 | 7476 | 65.4 | 69.9 | 1.07 |
| REL 3 | 4154 | 68.4 | 72.9 | 1.07 |
| REL 4 | 7475 | 180.6 | 185.5 | 1.03 |
| REL 4 | 7476 | 77.2 | 82.1 | 1.06 |
| REL 4 | 4154 | 131.7 | 141.3 | 1.07 |
| REL 5 | 7475 | 361.0 | 368.4 | 1.02 |
| REL 5 | 7476 | 174.0 | 216.5 | 1.24 |
| REL 5 | 4154 | 246.4 | 262.2 | 1.06 |
| REL 6 | 7475 | 973.4 | 989.7 | 1.02 |
| REL 6 | 7476 | 396.7 | 464.9 | 1.17 |
| REL 6 | 4154 | 416.0 | 438.5 | 1.05 |
| REL 7 | 7475 | 101.3 | 105.7 | 1.04 |
| REL 7 | 7476 | 65.5 | 70.7 | 1.08 |
| REL 7 | 4154 | 23.9 | 25.8 | 1.08 |
| REL 8 | 7475 | 226.3 | 231.3 | 1.02 |
| REL 8 | 7476 | 78.1 | 84.2 | 1.08 |
| REL 8 | 4154 | 56.3 | 61.1 | 1.09 |
| REL 9 | 7475 | 305.1 | 311.9 | 1.02 |
| REL 9 | 7476 | 78.1 | 84.8 | 1.09 |
| REL 9 | 4154 | 67.8 | 71.8 | 1.06 |
| REL 10 | 7475 | 485.0 | 489.6 | 1.01 |
| REL 10 | 7476 | 178.7 | 205.1 | 1.15 |
| REL 10 | 4154 | 175.1 | 187.3 | 1.07 |
| REL 11 | 7475 | 1142.7 | 1173.3 | 1.03 |
| REL 11 | 7476 | 701.0 | 744.9 | 1.06 |
| REL 11 | 4154 | 475.3 | 490.6 | 1.03 |

It is clear from the above data, that generally the silicone release coatings containing the release modifier compositions of this invention provide higher release forces against standard tapes and provide extremely smooth delamination at slow delamination speeds in comparison to conventional release coatings. The silicone release coatings containing the release modifier compositions of this invention also show higher efficiency than the convention release coatings.

That which is claimed is:

1. A release modifier composition which comprises (i) a fluorosilicone compound having the formula:

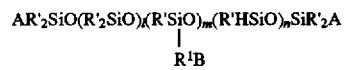

wherein R' is selected from the group consisting of monovalent aromatic hydrocarbons having upto 20 carbon atoms and monovalent aliphatically saturated hydrocarbons having from 1 to 20 carbon atoms. A is selected from the group consisting of R' and hydrogen, $R^1$ is an alkylene group having at least 2 carbon atoms, and B is a perfluoroalkyl group having from 4 to 8 carbon atoms, l has a value of from 0 to 100, m has a value of from 1 to 100, and n has a value of from 1 to 100 with the proviso that m/(l+m+n) has a value greater than or equal to 0.08 and with the proviso that there are at least 3 silicon-bonded hydrogen atoms per said compound (i) and (ii) a MQ resin consisting essentially of units of the formulae: $SiO_2$ (Q) and $R_3SiO_{1/2}$ (M) wherein R is independently selected from the group consisting of monovalent aromatic hydrocarbon groups having from upto 20 carbon atoms, monovalent saturated aliphatic hydrocarbon groups having from 1 to 20 carbon atoms, hydrogen atoms, and alkenyl groups having from 2 to 20 carbon atoms, provided that there is at least one alkenyl group having terminal unsaturation per MQ resin molecule.

2. A release modifier composition according to claim 1, wherein the ratio of monovalent (M) units to tetravalent (Q) units in the MQ resin (ii) is from 0.2/1 to 4/1.

3. A release modifier composition according to claim 1, wherein R' is methyl and the alkenyl group of Component (ii) is selected from the group consisting of vinyl, higher alkenyl groups having the formula —$(CH_2)_aCH$=$CH_2$ wherein a has a value of 1 to 18, and higher alkenyl groups having the formula— $(CH_2)_bCH$=$CH$—$(CH_2)_cCH$=$CH_2$ where b has a value of 1 to 9 and c has a value of 1 to 9.

4. A release modifier composition according to claim 1, wherein $R^1$ is selected from the group consisting of —$CH_2CH_2$—, —$CH_2CH_2CH_2$—, —$CH(CH_3)CH_2$—, —$(CH_2)_4$—, —$CH(CH_3)CH_2CH_2$—, —$(CH_2)_5$—, —$(CH_2)_6$—, —$CH_2CH_2CH(CH_2CH_3)CH_2$—, —$(CH_2)_8$—, —$(CH_2)_{10}$—, —$(CH_2)_{18}$— and (—$C_6H_4CH_2$—).

5. A release modifier composition according to claim 1, wherein B is selected from the group consisting of —$(CF_2)_3CF_3$, —$CF_2CF(CF_3)_2$, —$C(CF_3)_3$, —$CF(CF_3)CF_2CF_3$, —$(CF_2)_4CF_3$, —$CF_2(CF_2)_4CF_3$, —$(CF_2CF_2)_3CF_3$, and —$C_8F_{17}$.

6. A release modifier composition according to claim 1, further comprising at least one ingredient selected from the group consisting of vinyl-endblocked polydimethylsiloxanes, hexenyl-endblocked polydimethylsiloxanes, catalysts, and inhibitors.

7. A release modifier composition according to claim 1, wherein the amount of Component (ii) comprises from 10 to 95% by weight and the amount of Component (i) from 0.05 to 40% by weight of the release modifier composition.

8. A silicone release coating composition which comprises (A) a release modifier which comprises at least 0.05% by weight based on the total weight of the release coating composition of a fluorosilicone compound having the formula:

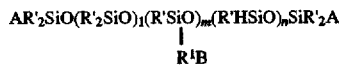

wherein R' is selected from the group consisting of monovalent aromatic hydrocarbons having from 1 to 20 carbon atoms and saturated aliphatic hydrocarbons having from 1 to 20 carbon atoms, A is selected from the group consisting of R' and hydrogen, $R^1$ is an alkylene group having at least 2 carbon atoms, and B is a perfluoroalkyl group having from 4 to 8 carbon atoms, l has a value of from 0 to 100, m has a value of from 1 to 100, and n has a value of from 1 to 100 with the proviso that m/(l+m+n) has a value greater than or equal to 0.08 and with the proviso that there are at least 3 silicon-bonded hydrogen atoms per compound (i), (B) an organosilicon compound having at least three silicon-bonded hydrogen atoms per molecule, (C) an effective amount of a precious metal catalyst capable of promoting the addition reaction between alkenyl groups and silicon-bonded hydrogen groups, and (D) a polydiorganosiloxane having the general formula $X_2Y^oSiO(X_2SiO)_x(XYSiO)_y SiX_2Y^o$ wherein each X is independently selected from the group consisting of phenyl groups and saturated monovalent hydrocarbon groups having from 1 to 10 carbon atoms, Y denotes an alkenyl group having up to 6 carbon atoms, $y^o$ is selected from the group consisting of X and Y, and the average value of the sum total of x and y is such that polydiorganosiloxane (D) has a viscosity at 25° C. of at least 10 mPa.s provided that there are at least 2 silicon-bonded alkenyl-functional groups per polydiorganosiloxane molecule (D).

9. A silicone release coating composition according to claim 8, wherein Component (B) is selected from the group consisting of organosilicon compounds having the general formula

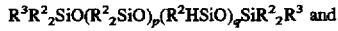

organosilicon compounds having the general formula

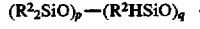

wherein $R^2$ is selected from the group consisting of alkyl groups having up to 10 carbon atoms and aryl groups having up to 10 carbon atoms, $R^3$ is selected from the group consisting of $R^2$ and hydrogen, p has a value of from 0 to 20, q has a value of from 1 to 70, and there are at least 3 silicon-bonded hydrogen atoms present per molecule.

10. A silicone release coating composition which comprises (A) a release modifier composition which comprises (i) a fluorosilicone compound having the formula:

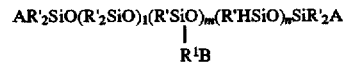

wherein R' is selected from the group consisting of monovalent aromatic hydrocarbons having upto 20 carbon atoms and monovalent saturated aliphatic hydrocarbons having from 1 to 20 carbon atoms, A is selected from the group consisting of R' and hydrogen, $R^1$ is an alkylene group having at least 2 carbon atoms, and B is a perfluoroalkyl group having from 4 to 8 carbon atoms, l has a value of from 0 to 100, m has a value of from 1 to 100, and n has a value of from 1 to 100 with the proviso that m/(l+m+n) has a value greater than or equal to 0.08 and with the proviso that there are at least 3 silicon-bonded hydrogen atoms per said compound (i) and (ii) an MQ resin consisting essentially of units of the formulae: $SiO_2$ (Q) and $R_3SiO_{1/2}$ (M) wherein R is independently selected from the group consisting of monovalent aromatic hydrocarbon groups having upto 20 carbon atoms, monovalent saturated aliphatic hydrocarbon groups having from 1 to 20 carbon atoms, hydrogen atoms and alkenyl groups having from 2 to 20 carbon atoms, provided that there is at least one alkenyl group having terminal unsaturation per MQ resin molecule, (B) an organosilicon compound having at least three silicon-bonded hydrogen atoms per molecule, (C) an effective amount of a precious metal catalyst capable of promoting the addition reaction between alkenyl groups and silicon-bonded hydrogen groups, and optionally (D') a polydiorganosiloxane having at least 2 silicon-bonded alkenyl-functional groups per polydiorganosiloxane molecule.

11. A silicone release coating composition according to claim 10, wherein Component (B) is selected from the group consisting of organosilicon compounds having the general formula

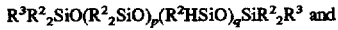

organosilicon compounds having the general formula

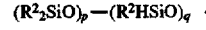

wherein $R^2$ is selected from the group consisting of alkyl groups having up to 10 carbon atoms and aryl groups having up to 10 carbon atoms, $R^3$ is selected from the group consisting of $R^2$ and hydrogen, p has a value of from 0 to 20, q has a value of from 1 to 70, and there are at least 3 silicon-bonded hydrogen atoms present per molecule.

12. A silicone release coating composition according to claim 10, wherein Component (C) is selected from the group consisting of chloroplatinic acid, complexes of chloroplatinic acid and divinyltetramethyldisiloxane, platinum acetylacetonate, complexes of platinous halides with unsaturated compounds selected from the group consisting of ethylene, propylene, organovinylsiloxanes and styrene, hexamethyldiplatinum, $PtCl_2$, $PtCl_3$, $PtCl_4$, and $Pt(CN)_3$.

13. A silicone release coating composition according to claim 10, wherein Component (D') is a polydiorganosiloxane having the general formula $X_yY^oSiO(X_2SiO)_x(XYSiO)_7 SiX_2Y^o$ wherein each X is independently selected from the group consisting of phenyl groups and monovalent saturated hydrocarbon groups having from 1 to 10 carbon atoms, Y denotes an alkenyl group having up to 6 carbon atoms, $Y^o$ is selected from the group consisting of X and Y, and the average value of the sum total of x and y is such that (D') has a viscosity at 25° C. of at least 10 mPa.s.

14. A silicone release coating composition according to claim 10, wherein the ratio of the number of SiH groups to alkenyl groups in the composition is from 1.1/1 to 1.8/1.

15. A silicone release coating composition according to claim 10, wherein the composition further comprises at least one ingredient selected from the group consisting of cure inhibitors, bath life extenders, and α-olefins having 12 to 20 carbon atoms.

16. A silicone release coating composition according to claim 15, wherein the cure inhibitor is selected from the group consisting of acetylenic alcohols, maleates, fumarates, conjugated ene-ynes, and cyclic siloxanes having the general formula $[(D)_2SiO]_w$ wherein D is selected from the group consisting of lower alkyl groups and lower alkenyl groups, and w has a value of from 3 to 8.

17. A silicone release coating composition according to claim 15, wherein the bath life extender is selected from the group consisting of compounds which contain one or more primary or secondary alcohol groups, carboxylic acids, compounds which yield carboxylic acids when exposed to water, cyclic ethers, and water.

18. A process of coating a substrate to provide the substrate with the ability to release adhesive materials therefrom, the process comprising (a) a first step of applying to the substrate a silicone release coating composition which comprises (A) a release modifier composition which comprises (i) a fluorosilicone compound having the formula:

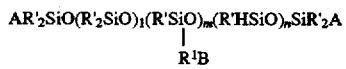

wherein R' is selected from the group consisting of monovalent aromatic hydrocarbons having upto 20 carbon atoms and monovalent saturated aliphatic hydrocarbons having from 1 to 20 carbon atoms, A is selected from the group consisting of R' and hydrogen, $R^1$ is an alkylene group having at least 2 carbon atoms, and B is a perfluoroalkyl group having from 4 to 8 carbon atoms, l has a value of from 0 to 100, m has a value of from 1 to 100, and n has a value of from 1 to 100 with the proviso that m/(l+m+n) has a value greater than or equal to 0.08 and with the proviso that there are at least 3 silicon-bonded hydrogen atoms per said compound (i) and (ii) an MQ resin consisting essentially of units of the formulae: $SiO_2$ (Q) and $R_3SiO_{1/2}$ (M) wherein R is independently selected from the group consisting of monovalent aromatic hydrocarbon groups having upto 20 carbon atoms, monovalent saturated aliphatic hydrocarbon groups having from 1 to 20 carbon atoms, hydrogen atoms and alkenyl groups having from 2 to 20 carbon atoms, provided that there is at least one alkenyl group having terminal unsaturation per MQ resin molecule, (B) an organosilicon compound having at least three silicon-bonded hydrogen atoms per molecule, (C) an effective amount of a precious metal catalyst capable of promoting the addition reaction between alkenyl groups and silicon-bonded hydrogen groups, and optionally (D') a polydiorganosiloxane having at least 2 silicon-bonded alkenyl-functional groups per molecule and thereafter (b) a second step of exposing the substrate and applied composition to heat.

* * * * *